Figure 1:
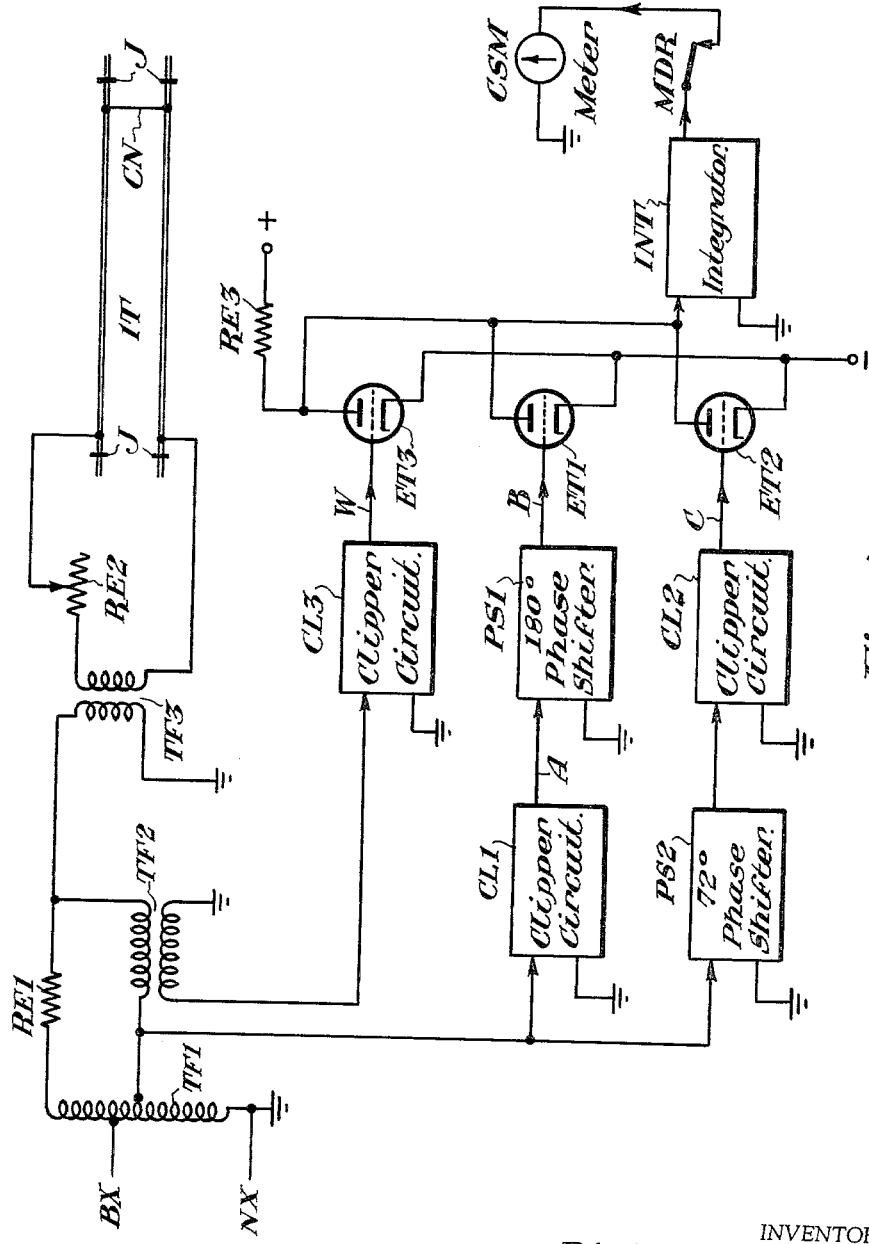

March 8, 1966  R. D. CAMPBELL  3,239,757
PHASE SHIFT MEASURING APPARATUS
Original Filed June 5, 1962  2 Sheets-Sheet 2

INVENTOR.
Richard D. Campbell.
BY
W. L. Stout
HIS ATTORNEY 3,239,757
PHASE SHIFT MEASURING APPARATUS
Richard D. Campbell, Harmarville, Pa., assignor to Westinghouse Air Brake Company, Swissvale, Pa., a corporation of Pennsylvania
Original application June 5, 1962, Ser. No. 200,207, now Patent No. 3,155,350, dated Nov. 3, 1964. Divided and this application Apr. 15, 1964, Ser. No. 359,881
4 Claims. (Cl. 324—83)

This application is a division of my copending application for Letters Patent of the United States Serial No. 200,207, filed June 5, 1962, for a Track Fullness System, now Patent No. 3,155,350, issued November 3, 1964.

My invention relates to phase shift measuring apparatus. More particularly, this invention pertains to phase shift measuring apparatus for use in track fullness systems for railway classification yard storage tracks where the measurement preferably is limited between phase shifts representative of empty and full track conditions.

In the automatic operation of railway classification yards, one factor used in controlling the speed of the moving cars is that known as the track fullness factor or the distance-to-go-to-coupling. One method of obtaining this factor is to determine the space remaining in a storage track, which in turn may be related to the impedance of the track rails to the closest shunt provided by the wheels and axles of a railroad car in that track. As disclosed in the parent application, one possible arrangement utilizes the shift of the phase angle of the track current of an alternating current track circuit caused by the impedance of the track rails. This resulting phase angle is a measurement of the distance remaining, that is, the empty space remaining, in the particular storage track. This type of operation provides a reliable measure of the actual distance-to-go in each particular storage track. Therefore, it becomes necessary, in order to determine the track fullness when using such an arrangement, to measure the phase angle shift of the track current. This measurement, of course, must be in terms usable in the speed control system supplied for the yard operation. In addition, this measurement should be within the limits imposed by the length of the associated storage track, that is, the range limit between the full track condition when no phase shift occurs and the maximum phase shift occurring under empty track conditions.

Accordingly, one object of my invention is phase shift measuring apparatus operable within established phase shift limits to provide a reliable indication of the actual phase shift from a reference point.

Another object of my invention is to provide phase shift measuring apparatus suitable for use within a track fullness system for railway classification yards.

It is also an object of my invention to provide phase shift measuring apparatus for obtaining the measurement of the phase angle displacement of an alternating current supplied across the rails of a storage track in a railway classification yard.

A further object of my invention is phase shift measuring apparatus in which two known reference voltages are use to establish preselected limits for the phase shift measurement.

Other objects, features and advantages of my invention will become apparent from the following specification when taken in connection with the accompanying drawings.

In defining the practice of my invention, I have illustrated the phase shift apparatus as used for measuring the angle of phase shift of the current flowing in an alternating current track circuit. Transformers are used not only to feed the alternating current into the rails of a track section but also to reflect back a voltage carrying the phase shift caused by the impedance of the rails included in the alternating current track circuit. The resulting voltage from the transformers is fed into a square wave generator and the resulting output is applied to the control grid of a conventional triode electron tube. At the same time, a base reference voltage from the alternating current source is supplied to another square wave generator of similar type and then fed through apparatus which shifts the phase of the square wave 180 degrees. From here, the square wave is applied to the control grid of a second triode electron tube. The base reference voltage is also, in another circuit path, shifted in phase by a preselected amount equivalent to the maximum phase shift possible in the particular track circuit in use, that is, the maximum amount that the length of that storage track can cause. This phase shifted alternating current voltage is then applied to a square wave generator and from its output to the control grid of a third triode type electron tube. The three electron tubes are connected in AND logic circuitry. This results in an output only during a time period representative of the phase shift of the track current. The output of the AND circuit is fed through an integrator device of my conventional type to provide a readable and usable signal representative of the phase shift.

I shall now describe a specific circuit arrangement embodying one form of my invention and shall then point out the novelty of my invention in the appended claims. In describing this specific circuit arrangement, reference will be made from time to time to the accompanying drawings in which:

FIG. 1 is a diagrammatic illustration of the phase shift measuring apparatus embodying one form of my invention.

Figure 2:
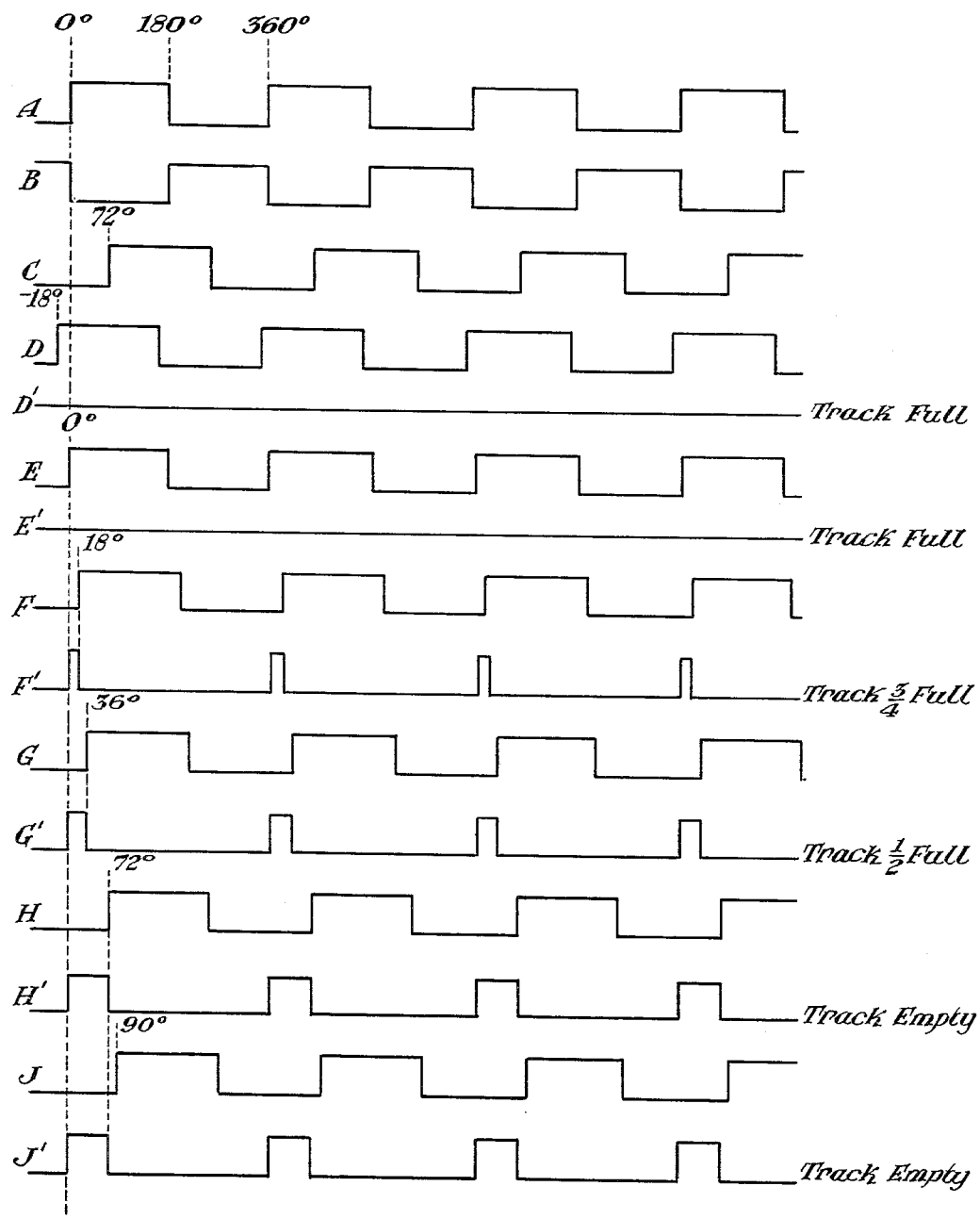

A timing diagram is shown in FIG. 2 as an aid in the understanding of the operation of the apparatus of my invention illustrated in FIG. 1.

Referring now to FIG. 1 of the drawings, in the upper left thereof is shown the winding of an autotransformer TF1. The input or primary terminals of transformer TF1 are connected across the terminals of a commercial source of alternating current. For purposes of simplicity, the actual source of alternating current is not shown in the drawings but its terminals are designated by the reference characters BX and NX. In one specific application of my invention, the primary terminals of autotransformer TF1 are so arranged that the normal voltage of the commercial source will provide, at the end terminals of the winding of the autotransformer, an output of approximately 180 volts. One of the end terminals of transformer TF1 is connected to ground, i.e., system common. The other terminal is connected through a resistor RE1, for example, 350 ohms, to one end of the primary windings of each of second and third transformers designated TF2 and TF3, respectively. The second end of the primary winding of transformer TF2 is connected to a tap on the winding of autotransformer TF1 at approximately the 75% point of the winding. The second end of the primary winding of transformer TF3 is connected to ground. Transformer TF3 is a step-down transformer having approximately a 30 to 1 ratio and transformer TF2 is a step-up transformer having approximately a 1 to 5 ratio.

It is to be understood at the outset that the apparatus organization per se, described above, forms no part of my invention and that the given voltage and resistor values, and the transformer ratios could be other than those stated. Furthermore other alternating current track circuit apparatus organizations could conceivably be employed. The track circuit apparatus shown and discussed to this point, and the values and ratios stated are merely given as one example of such apparatus that has been found to operate very successfully with the apparatus of my invention. Further discussion and the operation of the above described apparatus will be set forth later in the specification.

There is also shown in FIG. 1 a section of railway track designated 1T and intended to illustrate a railway car storage track in a gravity type railway car classification yard. Railway cars routed to the storage track enter the track from the left hand end thereof and proceed by gravity to the right hand end of the track or to coupling with previous cars routed to such track. The rails of storage track 1T are insulated from the rails of the track to the left and right thereof by insulated rail joints J, shown in the drawings by short lines drawn perpendicularly across the rails. The storage track is provided with an alternating current track circuit or loop circuit including the secondary winding of previously discussed track transformer TF3, connected through a resistor RE2 across the rails of the storage track at its entering end, and a conductor CN connected across the rails of the storage track at its end remote from the transformer. This loop circuit for storage track 1T thus extends from one side of the secondary winding of tranformer TF3 through resistor RE2, one of the rails of the storage track, conductor CN, and the other rail of the storage track to the other side of the secondary winding of transformer TF3. Resistor RE2 is adjustable so that the alternating current loop track circuit can be readily adjusted for proper operation.

It is believed that a further brief discussion of the principles employed by my invention in determining track fullness will be appropriate at this point in the description. The impedance of a section of railway track to the flow of an alternating current supplied thereto is dependent upon its length, the size of the rails, and the condition of the ballast between the rails. Such impedance includes inductive and capacitive components of which the reactance parameter of the impedance of the track section is comprised and upon which phase angle displacement of the alternating current depends. It has been found in one installation, employed herein only as an example of the operation of the apparatus of my invention, that the impedance of a section of railway storage track having a length of 2700 feet has a reactive component which produces a phase angle displacement of approximately 72 degrees in a 60 c.p.s. alternating current supplied across the rails of the track section. Such track section has an electrical conductor or shunt, similar to conductor CN shown in FIG. 1, connected across the rails at a point 2700 feet from the points of connection of the alternating current supplied thereto. Since the length of an average railway car is considered to be 45 feet, 60 railway cars can be stored in the 2700 foot track section.

The shunt across the track rails caused by the rear wheels and associated axle of each additional railwy car routed to the storage track, and traveling to coupling with the previous cars in such track, in effect reduces the length of the track circuit by 45 feet and causes a change of approximately 1.2 degrees in phase angle shift of the alternating current supplied to the track rails. In other words, if there are no cars in the storage track, a phase displacement of 72 degrees in the alternating current occurs. If the track is full, that is, if the last pair of wheels and associated axle of the last car to enter the track are adjacent the points of connection of the alternating current supplied to the rails, substantially no phase displacement of the alternating current takes place. It is thus readily apparent that each car to enter the storage track and traveling to coupling with the previous cars routed to such track causes a reduction in phase angle displacement of 1.2 degrees. The phase angle displacement of the alternating current is, therefore, indicative of the distance to travel or track fullness of the storage track.

Referring again to FIG. 1, it will be seen that one end of the secondary winding of transformer TF2, previously discussed, is connected to ground and the output from the second end of such winding is supplied to a clipper circuit designated CL3. The impedance of track section 1T is reflected into the primary winding of transformer TF3 and in turn into the primary and secondary windings of transformer TF2. Thus the alternating current supplied to clipper circuit CL3 from the secondary winding of transformer TF2 reflects the phase shift occasioned by the impedance of track section 1T. In order to have a reference against which to compare the phase shifted alternating track circuit current and thereby determine, as hereinafter discussed, the degree of such phase shift, the 75% point of the winding of autotransformer TF1, in addition to being connected to the second end of the primary winding of transformer TR2, as previously mentioned, also supplies a reference alternating current to a clipper circuit designated CL1 and to a 72 degree phase shifter designated PS2.

The output of clipper circuit CL1 is supplied to a 180 degree phase shifter designated PS1 and the output of 72 degree phase shifter PS2 is supplied to another clipper circuit designated CL2. Clipper circuits CL1, CL2, and CL3 clip the alternating current sine waves supplied thereto to convert such waves into susbtantially a square waveform. The outputs of clipper circuits CL2 and CL3 are supplied to the grids of electron tubes designated ET2 and ET3, respectively. Similarly, the output of phase shifter PS1 is supplied to the grid of an electron tube designated ET1. These tubes are here shown as triodes and have their cathodes connected in multiple with each other and to the negative terminal of a source of direct current. Similarly, the plates of the tubes are connected in multiple with each other and through a resistor RE3 to the positive terminal of the direct current source. For purposes of simplicity this direct current source is not shown in the drawings but its positive and negative terminals are designated by the conventional symbols + and −, respectively. The plates of tubes ET1, ET2, and ET3 are connected to the input of an integrator designated INT hereinafter discussed. Clipper circuits, phase shifters, and triode electron tubes are well known components, and no detailed discussion of such apparatus is required except as necessary in the following discussion of the operation of the triode tube arrangement and in conjunction with the diagram of FIG. 2.

Electron tubes ET1, ET2, and ET3 and their connections, discussed above, form a basic computer circuit employing AND logic which is in reality a NOR circuit in accordance with the Boolean algebraic equation $\overline{A+B+C}=$ an output. Referring to FIG. 1, it will be readily apparent that tube ET1 is conducting only when a positive current pulse is supplied from phase shifter PS1 to the grid of the tube. Similarly, tubes ET2 and ET3 are conducting only when positive current pulses are supplied from clippers CL2 and CL3, respectively, to the grids of these tubes. When any one or more of the tubes are conducting, the current from the positive (+) terminal of the previously mentioned direct current source flows from the plate of the conducting tube or tubes to the cathode of such tubes and thence to the negative (−) terminal of such current source. No current is supplied to integrator INT at such time. When all three tubes are non-conducting or off, that is, when no positive current pulses are supplied to the grids of any of the tubes, current from the positive (+) terminal of the direct current source is supplied to integrator INT.

The operation of the phase shift measuring apparatus thus far described will now be explained by the following discussion of the diagram shown in FIG. 2 of the drawings. Waveform A of FIG. 2 illustrates the pulses from the output (point A) of clipper circuit CL1 (FIG. 1), such output pulses being in phase with the sine wave of the reference alternating current supplied to the clipper circuit from autotransformer TF1. Waveform B illustrates the pulses from the output (point B) of 180 degree phase shifter PS1, such pulses being supplied to the grid of electron tube ET1 (FIG. 1). It is readily apparent that these pulses are illustrated in FIG. 2 as being shifted in phase 180 degrees from the pulses illustrated in waveform A. Waveform C illustrates the pulses from the output (point C) of clipper circuit CL2 (FIG. 1), such pulses being supplied to the grid of electron tube ET2. These pulses are shown as shifted in phase 72 degrees from the pulses shown in waveform A, such phase shifting being provided by 72 degree phase shifter PS2.

Waveform D illustrates the output pulses (point W) from clipper circuit CL3 when the alternating current sine wave from the secondary winding of transformer TF2 (FIG. 1) is shifted so that it leads the reference alternating current sine wave by 18 degrees. A leading phase shift may occur when the storage track is completely full and the track circuit apparatus is out of adjustment. However, the 18 degree leading phase shift is an exaggeration employed only for purposes of convenient illustration in the diagram of FIG. 2 and normally any change in the adjustment of the track circuit will result in an improper phase shift of only a few degrees. The "waveform" D' shown in FIG. 2 is intended to illustrate that storage track 1T is full when the sine wave of the alternating current from the secondary winding of transformer TF2 is shifted as shown in waveform D and, therefore, that no direct current pulses are supplied to integrator INT at such time. The normal pulse waveform from clipper circuit CL3, when the track circuit apparatus is in perfect adjustment and the track is full, is illustrated by waveform E, and "waveform" E' illustrates that again no direct current pulses are supplied to integrator INT at such time.

Referring to waveforms B, C and D it will be readily apparent that at no time are all three waveforms simultaneously in the lower half of their cycles or in their "off" condition. This is also true of the combination of waveforms B, C, and E. Consequently the grids of one or more of electron tubes ET1, ET2 and ET3 are being supplied with positive current under conditions of waveforms D and E and at least one of these tubes is, therefore, always in its "on" condition and conducting. No direct current is supplied to integrator INT under such condition since the current from the positive (+) terminal of the direct current source flows through the conducting tube or tubes to the negative (−) terminal of such source. As will become apparent hereinafter, the total lack of current to integrator INT results in a "track full" indication.

Referring to waveform F in FIG. 2, it will be seen that the pulses of such waveform lag in phase the reference pulses of waveform A by 18 degrees. As indicated in the drawing, waveform F is intended to provide an indication that storage track 1T is ¾ full, that is, ¼ empty and that 15 average car spaces are available in the track (each car space or 45 feet of available space being represented by 1.2 degrees of phase shift). Referring to waveform F', it will be seen that pulses having an 18 degree width result from waveform F being supplied to the grid of electron tube ET3. Waveform F' occurs due to waveforms B, C, and F being simultaneously in the lower half of their cycles or "off" for 18 degrees of their full cycles. During such periods no positive current is supplied to the grids of any of the tubes ET1, ET2, and ET3 and all three tubes are, therefore, non-conducting. Current from the positive terminal (+) of the direct current source is supplied to integrator INT during each period represented by waveform F'. Waveforms G and H represent the pulses supplied to the grid of tube ET3 when storage track 1T is half full and completely empty, respectively. Waveforms G' and H' show the width of the pulses supplied to integrator INT in response to the pulses of waveforms G and H, respectively, that is, 36 degree and 72 degree width pulses, respectively. In view of the above detailed discussion relative to the pulses of waveforms F and F', no detailed discussion of the NOR circuit including tubes ET1, ET2 and ET3, relative to waveforms G, G', H and H' is believed necessary in view of the self-explanatory nature of the diagram of FIG. 2.

Referring to waveform J of FIG. 2, it will be seen that a phase shift of 90 degrees in the pulses supplied to the grid of tube ET3 is illustrated. As with the leading 18 degree phase shift of waveform D previously discussed, such 90 degree phase shift is an exaggeration employed for purposes of convenience of illustration, and is intended to indicate the phase shift occurring when storage track 1T is empty and the track circuit apparatus is out of adjustment. As with the leading phase shift, such change in adjustment of the track circuit normally causes only a few degrees of improper phase shift. It will be seen from waveform J', however, that a phase shift such as illustrated by waveform J results in the same input pulses to integrator INT as those occasioned by waveform H, which is the proper waveform when track section 1T is empty and the track circuit apparatus is in correct adjustment. Such limiting of the width of the input pulses to integrator INT is provided by the 72 degree phase shifted reference current illustrated by waveform C. Thus the 72 degree phase shifter PS2, and associated clipper circuit CL2 and electron tube ET2, are employed to confine the width of the pulses supplied to integrator INT to a maximum 72 degree width.

Referring again to FIG. 1, as described above, integrator INT is supplied at different times with a different series of pulses of direct current. The width of the direct current pulses of any one series are identical, but the width of the pulses of different series varies in accordance with the number of cars in storage track 1T. That is, the greater the available car space in storage track 1T, the greater the width of the pulses representing such car space. Integrator INT integrates the pulses supplied thereto and provides at its output a value of voltage or a voltage signal proportional to the width of each pulse of the series of pulses supplied thereto during any period of time, i.e., a period of time when the car space available in storage track 1T remain constant, regardless of the brevity of such period of time. Such integrators or integrating circuits are well known in the art and no detailed discussion of the operation thereof is believed necessary.

The output from integrator INT is supplied over a normally closed contact MDR to a car space voltage meter designated CSM. Contact MDR represents a relay contact so controlled by motion detector apparatus, shown in the parent application, as to be open, and thus interrupt the output of integrator INT, when a moving car is detected in section 1T. The meter CSM, in the specific form illustrated, is preferably graduated to indicate or display the available car space in storage track 1T, such indication changing in accordance with the value of the voltage signal supplied thereto from integrator INT. However, it is obvious that the meter could be graduated to indicate the phase angle shift of the track circuit current, or to have a standard voltage display dial. In this latter case, it would be necessary for the observer to interpret each different voltage reading displayed into available car space or angle of phase shift.

The apparatus embodying my invention thus provides for the measurement of the phase shift of an alternating current within preselected limits established in accordance with the maximum and minimum phase shifts possible in the system in which the measurement is to be made.

The apparatus uses well known elements of proven operation in a combination which produces the results desired. Efficiency and accuracy are thus obtained.

Although I have herein shown and described but one form of phase shift measuring apparatus embodying my invention, it is to be understood that various changes may be made in the disclosed apparatus within the scope of the appended claims without departing from the spirit and scope of the invention.

Having thus described my invention, what I claim is:

1. Phase shift measuring apparatus, comprising in combination,
    (a) a first source of voltage of variable phase,
    (b) a second source supplying a base reference voltage,
    (c) circuit connection means electrically interconnecting said first source of voltage variable phase and said second source of base reference voltage, said circuit connection means controlling the amount of phase shift of said source of voltage variable phase with reference to said base reference voltage,
    (d) a logic circuit arrangement,
    (e) a first signal generating means supplied by said second source and having an electrical connection to said logic circuit for applying a first signal having a predetermined phase shift relative to said base reference voltage to said logic circuit arrangement to establish a lower limit of measurement,
    (f) a second signal generating means supplied by said second source and having an electrical connection to said logic circuit for applying a second signal having a predetermined phase shift from said base reference voltage phase to said logic circuit arrangement to establish an upper limit of phase shift measurement,
    (g) a third signal generating means supplied by said first source and having an electrical connection to said logic circuit for applying a third signal having a phase representative of said voltage of variable phase to said logic circuit arrangement,
    (h) said logic circuit arrangement being responsive to said first, second, and third signals for producing an output signal representative of the phase angle shift of said variable phase voltage within said upper and lower limits established by said predetermined phase shifts of said first and said second signals.

2. Phase shift measuring apparatus, comprising in combination,
    (a) a source of alternating current voltage,
    (b) circuit means electrically connected to said source of alternating current voltage, said circuit means producing another alternating current voltage signal having a variable phase displacement from said source voltage in accordance with the existing one of a plurality of possible distinctive conditions within said circuit means,
    (c) a first means electrically connected to said source, said first means producing a first signal shifted in phase from said source by a first preselected angle of displacement,
    (d) a second means electrically connected to said source, said second means producing a second signal shifted in phase from said source by a second and different preselected angle of displacement,
    (e) a third means electrically connected to said circuit means, said third means producing a third signal of variable phase shift in accordance with the angle of phase displacement of said other alternating current signal voltage,
    (f) logic circuitry of the AND type electrically connected individually to said first means, said second means and said third means to receive said first signal, said second signal and said third signal, said logic circuitry being controlled by said first, second, and third means for producing a distinctive series of output pulses for each phase shift condition of said third signal between said first and said second preselected angles of displacement,
    (g) integrating means electrically connected to said logic circuitry and responsive to each series of output pulses for producing a continuous indication of the existing phase displacement of said other alternating current voltage.

3. Apparatus for deriving a direct current signal distinctly representing within upper and lower limits the phase angle shift of an unknown signal from a first alternating current reference signal of a constant frequency, said apparatus comprising, in combination,
    (a) a first alternating current reference signal source,
    (b) first means electrically connected to said first alternating current reference signal source and responsive to said first alternating current reference signal for producing a first square wave signal in phase with the first reference signal,
    (c) second means electrically connected to said first means to receive said first square signal and invert the phase of said first square wave signal to produce a second square wave signal, said second square wave signal establishing said lower limit of phase angle shift,
    (d) third means electrically connected to said first alternating current reference signal source and responsive to said first alternating current reference signal for deriving a second reference signal of said frequency out of phase with the first alternating current reference signal by a phase angle equal to said upper limit of phase angle shift,
    (e) fourth means electrically connected to said third means to receive said second reference signal and to produce a third square wave signal in phase with the second reference signal,
    (f) circuit means electrically connected to said first alternating current signal source to produce said unknown signal of an unknown phase,
    (g) fifth means electrically connected to said circuit means, said fifth means changing said unknown signal into a fourth square wave signal,
    (h) a NOR circuit having as its separate inputs said second, third and fourth square wave signals, said NOR circuit having an output,
    (i) integrating means electrically connected to said output of said NOR circuit for deriving said direct current signal.

4. Apparatus for deriving a signal output representing within upper and lower limits the phase angle shift of an unknown signal from a first alternating current reference signal of a constant frequency, said apparatus comprising, in combination,
    (a) a first alternating current reference signal source,
    (b) first means electrically connected to said first alternating current reference signal source and responsive to said first alternating current reference signal for producing a first square wave signal in phase with the first reference signal,
    (c) second means electrically connected to said first means to receive said first square signal and invert the phase of said first square wave signal to produce a second square wave signal, said second square wave signal establishing said lower limit of phase angle shift,
    (d) third means electrically connected to said first alternating current reference signal source and responsive to said first alternating current reference signal for deriving a second reference signal of said frequency out of phase with the first alternating current reference signal by a phase angle equal to said upper limit of phase angle shift,
    (e) fourth means electrically connected to said third means to receive said second reference signal and to produce a third square wave signal in phase with the second reference signal, (f) circuit means electrically connected to said first alternating current signal source to produce said unknown signal of an unknown phase,
(g) fifth means electrically connected to said circuit means, said fifth means changing said unknown signal into a fourth square wave signal,
(h) a NOR circuit having as its separate inputs said second, third and fourth square wave signals, said NOR circuit having an output signal which represents within said upper and said lower limits the phase angle shift of said unknown signal from said first alternating current reference signal.

References Cited by the Examiner

UNITED STATES PATENTS

| | | |
|---|---|---|
| 2,603,746 | 7/1952 | Burkhart et al. _____ 328—91 |
| 2,763,748 | 9/1956 | Andres _____ 324—110 X |
| 2,838,733 | 6/1958 | Longfellow _____ 324—89 X |
| 2,863,117 | 12/1958 | Graustein _____ 324—89 X |
| 2,902,650 | 9/1959 | Kaiser _____ 324—83 X |
| 2,918,625 | 12/1959 | Houghton _____ 324—79 X |
| 3,048,712 | 8/1962 | Alm. |

WALTER L. CARLSON, *Primary Examiner.*